United States Patent Office 2,781,254
Patented Feb. 12, 1957

2,781,254

METHOD OF MANUFACTURING A CHEMICAL FERTILIZER FROM SLUDGE, CONTAINING AMMONIUM NITRATE, DICALCIUM PHOSPHATE, AND CALCIUM CARBONATE

Eiji Munekata, Kenji Doi, and Toshinori Onodera, Tsunetomi, Nobeoka, Miyazaki-ken, Japan, assignors to Asahi Chemical Industry Co., Ltd., Osaka, Japan No Drawing. Application December 21, 1953, Serial No. 399,582

2 Claims. (Cl. 71—47)

This invention relates to a method of manufacturing a chemical fertilizer by concentrating and drying, and further, if necessary, granulating sludge containing 15 to 45% water, ammonium nitrate, dicalcium phosphate, calcium carbonate, etc. while the loss of the fertilizing ingredients due to chemical reactions caused among the ingredients contained in the sludge is prevented as much as possible.

As is known, when sludge containing ammonium nitrate, dicalcium phosphate and calcium carbonate is heated, it will cause such decomposing reactions as are shown below:

$$2NH_4NO_3 + CaCO_3 = Ca(NO_3)_2 + 2NH_3 + CO_2 + H_2O \quad (1)$$

$$2CaHPO_4 + CaCO_3 = Ca_3(PO_4)_2 + CO_2 + H_2O \quad (2)$$

The reaction represented by the above Formula 1 will cause reduction in the fertilizing ingredients by the dispersion of ammonia and the reaction represented by Formula 2 will cause reduction in the fertilizing ingredients because of the conversion of the dicalcium phosphate to tricalcium phosphate which has less fertilizing effects.

Various methods of manufacturing a dry chemical fertilizer from sludge while reduction in fertilizing ingredients due to both of these reactions is prevented have hitherto been used but are not industrially advantageous, requiring complicated procedures such as separation, mixing, crushing, sieving, etc. For example, there is a method wherein, in order to prevent the above-mentioned two decomposing reactions, dicalcium phosphate and calcium carbonate which are solid are separated from sludge containing ammonium nitrate, dicalcium phosphate, calcium carbonate, etc., a solution consisting of ammonium nitrate, etc. and a solid mixture consisting of dicalcium phosphate and calcium carbonate are separately dried, then again mixed together and, further, granulated. There is another method of manufacturing a granular chemical fertilizer wherein sludge consisting of ammonium nitrate, dicalcium phosphate, calcium carbonate, etc. is dried until it becomes caky, is then crushed and sieved. However, in such methods, when the temperature of the drying gas is raised in excess, the above-mentioned decomposing Reactions 1 and 2 will occur. Therefore, the temperature of the heating gas must be made low and thus the thermal efficiency is low. Especially, when sludge consisting of ammonium nitrate, dicalcium phosphate, calcium carbonate, etc. and containing 15 to 45% water is heated in the atmosphere, the reactions represented by the above Formulas 1 and 2 will occur and the fertilizing ingredients will be reduced.

According to the present invention, those disadvantages of the hitherto existing methods can be eliminated and a chemical fertilizer can be economically and successfully manufactured, while the above-mentioned two decomposing reactions are prevented, in a comparatively simple way of quickly spraying sludge containing 15 to 45% water and consisting of ammonium nitrate, calcium carbonate, dicalcium phosphate, etc. into a heated air flow containing carbonic acid gas and thus drying it.

Now, when the decomposing reactions represented by the above two Formulas 1 and 2 are considered from the standpoint of the theory of chemical equilibrium, it is found that, with heating under a proper partial pressure of carbonic acid gas, the above reactions can be prevented. In order to determine an equilibrium constant of a reaction, Nernst's approximate formula is given. The formula is represented as follows:

$$\log K_p = \frac{Q_p}{4.574T} + 1.75 \Sigma m \log T + \Sigma mi$$

wherein $K_p$ = equilibrium constant
$Q_p$ = reaction heat in cal/g. mol.
$T$ = absolute temperature
$m$ = number of molecules of a gas in mol.
$i$ = common chemical constant In the above Formula 1, $K_p$ is given as follows:

$$K_p = p^2_{NH_3} \times p_{CO_2} \times p_{H_2O}$$

and then $$p_{NH_3} = p_{CO_2} = p_{H_2O}$$

wherein $p$ stands for partial pressure of a gas in atm. While in Formula 2, $$K_p = p_{CO_2} \times p_{H_2O}$$

and then $$p_{CO_2} = p_{H_2O}$$

From these equations, it will be understood that the above decomposing Reactions 1 and 2 can be prevented, when the sludge is concentrated and dried at a temperature below 160° C. in an air flow containing more than 90% carbonic acid gas at a normal pressure. However, the practice under such conditions disadvantageously requires either an air flow containing highly concentrated carbonic acid gas or heated air at a reduced temperature.

However, when the above two formulas are considered from the standpoint of the theory of the chemical reaction velocity, the reaction mechanisms of Formulas 1 and 2 are thought to be as follows. That is to say, it is thought that, in Formula 1, solid calcium carbonate which is a hardly soluble calcium salt dissolves in water, becomes liquid and then reacts with liquid ammonium nitrate. It is also thought that, in Formula 2, solid calcium carbonate and dicalcium phosphate which are hardly soluble calcium salts first dissolve in water, become liquid and then react with each other. In the latter case, both calcium carbonate and dicalcium phosphate are hardly soluble calcium salts. The solubility of each of them is as follows:

Calcium carbonate 18° C. $3.5 \times 10^{-3}$ gr./100 gr. $H_2O$
Dicalcium phosphate 25° C. $1.7 \times 10^{-2}$ gr./100 gr. $H_2O$ The solubility of dicalcium phosphate is higher than that of calcium carbonate. Therefore, the dissolving velocities from solid to liquid in both reaction Formulas 1 and 2 are considered to depend on the dissolving velocity of the calcium carbonate. Thus, the velocity of the decomposing reaction in Formulas 1 and 2 are found to depend on the dissolving velocity of calcium carbonate and on the reaction velocity of liquid calcium carbonate with ammonium nitrate or with dicalcium phosphate. However, as mentioned above, the calcium carbonate is such a hardly soluble calcium salt that its dissolving velocity is very low and the amount of calcium carbonate existing as dissolved in the solution is very small. Therefore, it is apparent that the velocity of the decomposing reaction containing calcium carbonate is very low.

According to the present invention, by carrying out spraying and drying operations faster than the velocity of the decomposing reaction, that is, within such a short time as less than several seconds, by utilizing the fact that the dissolving velocity of calcium carbonate is extremely low, it has been made possible to carry out concentrating and drying operations in an air flow containing less carbonic acid gas than is defined from the standpoint of the theory of the chemical equilibrium and at a temperature higher than is defined, for example, under such conditions as of 5% carbonic acid gas content and 180° C. temperature so that the decomposing reactions represented by the above Formulas 1 and 2 are completely prevented. By the method of this invention, the thermal efficiency can be improved and the operation can be facilitated.

The dry powder obtained in this case is powder of a uniform grain size of less than 1 mm. Even after the powders are dried, as they come into contact with hot air for less than scores of seconds, the temperature will rise more or less. However, at this time, calcium carbonate and ammonium nitrate are already solid and therefore the reaction velocity of the Formulas 1 and 2 are so low that there will be almost no loss of the fertilizing ingredients due to decomposition.

When water contained in the powder treated in this case is too much, the powder will soften and melt with the rise of the temperature and the decomposing reaction will occur. It is therefore necessary to select the spraying and drying conditions so as to make the water content in the treated powder less than is proper, preferably, less than 10%.

Now, in order to have the present invention understood more clearly, some examples are given in the following. The examples are illustrative only and are not intended to limit the present invention.

*Example 1*

The composition of sludge consisting of ammonium nitrate, dicalcium phosphate, calcium carbonate, potassium chloride, etc. was as follows:

| | Percent |
|---|---|
| Water | 20.3 |
| Ammonium nitrate | 34.5 |
| Dicalcium phosphate | 16.4 |
| Potassium chloride | 13.5 |
| Calcium carbonate | 9.8 |
| Others | 5.5 |

The composition of the powdered chemical fertilizer obtained by spraying and drying the sludge of the above composition with hot air at 180° C. containing 12% carbonic acid gas by means of an ordinary spray drier was as follows:

| | Percent |
|---|---|
| Water | 0.8 |
| Ammonium nitrate | 43.1 |
| Dicalcium phosphate | 20.5 |
| Potassium chloride | 16.9 |
| Potassium carbonate | 12.2 |
| Others | 6.5 |

There was no substantial loss due to decomposition of the fertilizing ingredients.

*Example 2*

The composition of sludge consisting of ammonium nitrate, dicalcium phosphate, calcium carbonate, etc. was as follows:

| | Percent |
|---|---|
| Water | 27.9 |
| Ammonium nitrate | 47.0 |
| Dicalcium phosphate | 14.3 |
| Calcium carbonate | 8.5 |
| Others | 2.3 |

The composition of the powder obtained by spraying and drying the sludge of the above composition with hot air at 160° C. containing 3% carbonic acid gas was as follows:

| | Percent |
|---|---|
| Water | 6.4 |
| Ammonium nitrate | 60.9 |
| Dicalcium phosphate | 18.6 |
| Calcium carbonate | 10.7 |
| Others | 3.4 |

There was no substantial loss due to decomposition of the fertilizing ingredients.

Granulated chemical fertilizer can be obtained by granulating and drying the above dry powder while preventing decomposition thereof, as shown in copending application, Serial No. 398,394, filed Dec. 15, 1953. The composition of the granulated fertilizer is as follows:

| | Percent |
|---|---|
| Water | 1.1 |
| Ammonium nitrate | 64.3 |
| Dicalcium phosphate | 19.7 |
| Calcium carbonate | 11.3 |
| Others | 3.6 |

What we claim is:

1. A method of manufacturing a dry chemical fertilizer from sludge comprising essentially ammonium nitrate, dicalcium phosphate and calcium carbonate, and from 15 to 45 percent water, and which is subject to decomposition reactions $$2NH_4NO_3 + CaCO_3 = Ca(NO_3)_2 + 2NH_3 + H_2O + CO_2$$

and $$2CaHPO_4 + CaCO_3 = Ca_3(PO_4)_2 + CO_2 + H_2O$$

which tend to take place upon heating in the presence of water and thereby result in the loss of fertilizer values, which comprises drying said sludge by spraying into a heated air flow containing carbonic acid gas in an amount less than that theoretically required to achieve equilibrium but sufficient to suppress the said reactions, said spraying and drying being substantially completed before the decomposition reactions can take place and being effected at a temperature from 160 to 180° C.

2. The method of claim 1 in which the concentration of the carbonic acid gas is 5 percent.

References Cited in the file of this patent

UNITED STATES PATENTS

| 1,968,323 | Sperr | July 31, 1934 |
| 2,122,037 | Lissauer | June 28, 1938 |
| 2,124,332 | DeRewal | July 19, 1938 |
| 2,155,372 | Beekhuis | Apr. 18, 1939 |
| 2,167,432 | Cox et al. | July 25, 1939 |
| 2,287,759 | Hardesty et al. | June 23, 1942 |
| 2,318,576 | Arnold | May 11, 1943 |
| 2,631,084 | Robinson | Mar. 10, 1953 |